United States Patent
Takehana et al.

(10) Patent No.: US 6,851,859 B2
(45) Date of Patent: Feb. 8, 2005

(54) BEARING UNIT, PRODUCTION METHOD THEREFOR AND SPINDLE MOTOR

(75) Inventors: Toshikazu Takehana, Ibaraki (JP); Hidekazu Tokushima, Kashiwa (JP); Hideo Shikata, Matsudo (JP); Katsutoshi Nii, Hitachi (JP); Jun Hirose, Nagano (JP)

(73) Assignees: Hitachi Powdered Metals Co., Ltd., Chiba (JP); Minebea Co., Ltd., Nagano (JP)

( * ) Notice: Subject to any disclaimer, the term of this patent is extended or adjusted under 35 U.S.C. 154(b) by 144 days.

(21) Appl. No.: 10/360,408

(22) Filed: Feb. 6, 2003

(65) Prior Publication Data

US 2003/0218397 A1 Nov. 27, 2003

(30) Foreign Application Priority Data

Feb. 7, 2002 (JP) .................................. 2002-031234

(51) Int. Cl.$^7$ ........................... F16C 32/06; B23P 15/00
(52) U.S. Cl. ........................ 384/100; 384/133; 384/279; 29/898.02
(58) Field of Search ............................... 384/100, 107, 384/111, 112, 114, 118, 133, 279, 902; 29/898.02

(56) References Cited

U.S. PATENT DOCUMENTS

| 5,645,355 A | * | 7/1997 | Tokushima et al. | .......... 384/133 |
| 5,821,655 A | * | 10/1998 | Tokushima et al. | .......... 384/114 |
| 6,105,250 A | * | 8/2000 | Tanaka et al. | ........... 29/898.02 |
| 2002/0037118 A1 | * | 3/2002 | Miyasaka | .................... 384/279 |

FOREIGN PATENT DOCUMENTS

| JP | 07-012127 | 1/1995 |
| JP | 11-013765 | 1/1999 |

* cited by examiner

*Primary Examiner*—Thomas R. Hannon
(74) *Attorney, Agent, or Firm*—Brinks Hofer Gilson & Lione

(57) ABSTRACT

A bearing unit comprises a bearing 60 formed of a sintered metal in which a magnetized magnetic powder is dispersed in its matrix and at least pores exposed on a bearing surface thereof are sealed by impregnation with a resin; a non-magnetic housing 90 accommodating the bearing 60; and a lubricating fluid M made of a magnetic fluid.

12 Claims, 2 Drawing Sheets

BEARING UNIT, PRODUCTION METHOD THEREFOR AND SPINDLE MOTOR

BACKGROUND OF THE INVENTION

1. Field of the Invention

The present invention relates to spindle motors mounted in, for example, information devices or acoustic devices which require precise rotation, relates to bearing units installed in such spindle motors, and relates to production methods therefor, and in particular relates to techniques to be used in HDDs (hard disk drives) in magnetic disk units.

2. Related Art

As precise rotation motors used in, for example, HDDs, there have been provided constructions in which a disk is rotated with high precision by a brushless dynamotor. Bearings suitable for these motors comprise a combination of a radial bearing and a thrust bearing respectively supporting the radial load and thrust load of the rotating shaft. These bearings are generally fluid dynamic bearings in which the rotating shaft is supported with high precision due to the dynamic pressure action of a lubricating oil.

Lubricating oils have generally been generally used as lubricating fluids. Japanese Patent Application, First Publication No. 1995-12127 proposes a bearing using a magnetic fluid. The magnetic fluid is produced by mixing ferromagnetic particles in a lubricating oil, and this magnetic fluid is used in combination with a magnet located in a bearing. In such a structure, the magnetic fluid is usually held in a lubricating pathway by magnetic force, and leakage of the lubricating fluid is thereby restrained. Such a bearing unit is suitable for HDDs in which oil leakage is not desirable. However, the structure in which a magnet is located in a bearing results in an increase of number of parts and a complicated structure, and this is not desirable for the reduction of thickness of motors. Japanese Patent Application, First Publication No. 1999-13765 proposes a structure in which a magnetic powder is mixed and dispersed in a sintered bearing, and then the bearing is magnetized allowing the magnet to be omitted.

In the sintered bearing containing a magnetic powder, relatively hard magnetic powder exists on a bearing surface, and the rotating shaft is not easy to fit thereto and tends to wear easily. Furthermore, the magnetic powder existing on the bearing surface is loosened by wear, and the loosened particles function as an abrasive between the rotating shaft and the bearing. As a result, wear is promoted and vibration characteristics are not stable, precise rotation is not obtained.

SUMMARY OF THE INVENTION

Therefore, an object of the present invention is to provide a spindle motor, a bearing unit, and production method therefor capable of improving the fitting performance between a rotating shaft and a bearing, and restraining the loose of the magnetic powder particles, thereby achieving reduction of wear and precise rotation.

The present invention provides a bearing unit comprising: a bearing formed of a sintered metal in which a magnetized magnetic powder is dispersed in its matrix and at least pores exposed on a bearing surface thereof are sealed by impregnation with a resin; a non-magnetic housing accommodating the bearing; and a lubricating fluid made of a magnetic fluid.

According to the bearing unit of the invention, a rotating shaft is inserted into the bearing and the magnetic fluid as a lubricating fluid is provided between the bearing and the rotating shaft. The magnetic fluid is magnetized due to dispersion of magnetic particles, and the magnetic force holds the magnetic fluid in the lubricating pathway, that is, the clearance between the bearing and the rotating shaft, whereby lubrication is effectively performed, and leakage of the lubricating fluid is restrained. Magnets are not required since the bearing functions as a magnet for holding the magnetic powder, and the structure thereof can therefore be simple without any additional parts, and the thickness of the structure can be reduced.

The bearing unit of the invention is essentially characterized in the pores existing on the bearing surface of the bearing being sealed by a resin. For this feature, the bearing surface of the bearing is lubricated by the resin, and the fitting performance between the bearing and the rotating shaft is improved in spite of dispersion of the magnetic powder. The resin adheres the powders consisting of the bearing to the bearing surface and restrains loose of the powders. As a result, wear due to the powders existing between the bearing and the rotating shaft is restrained, and vibration performance is therefore stable, and high precise rotation is obtained.

According to the preferred feature of the invention, the bearing surface of the bearing has grooves for generating dynamic pressure. In this feature, the dynamic pressure generated by the magnetic fluid in the grooves does not leak since the pores are sealed, and high rigidity of the bearing is maintained.

In the above feature, only pores existing in the bearing surface side may be sealed by impregnation with a resin. In this feature, other pores which are not sealed may be employed as fluid reservoirs.

In another aspect of the invention, there is provided a production method for a bearing unit. The method comprises: compacting a metallic raw material powder mixed with a magnetic powder into a bearing green compact; sintering the green compact into a sintered compact; then impregnating a resin into pores in the sintered compact to yield a bearing; accommodating and securing the bearing into a housing; and then magnetizing the bearing.

In the production method of the invention, the bearing may have a clearance of approximately a few $\mu$m to 10 $\mu$m with respect to the housing, and an adhesive is charged into the clearance. The clearance may regulate the amount of the adhesive, and sufficient securing strength between the bearing and the housing.

The order of the steps in the above production method may be changed. That is, the method may comprise: compacting a metallic raw material powder mixed with a magnetic powder into a bearing green compact; sintering the green compact into a sintered compact; accommodating and securing the bearing in a non-magnetic housing; then impregnating a resin into pores in the sintered compact to yield a bearing; and then magnetizing the bearing. In the method, the bearing may have a clearance of approximately a few $\mu$m to 10 $\mu$m with respect to the housing, and an adhesive is charged into the clearance.

In the production method of the invention, the sintered compact may be dipped into a resin solution in a container, and the interior of the container may then be decompressed. In this method, the interiors of the pores are decompressed, and the resin is quickly and reliably impregnated into the pores.

In the production method of the invention, grooves for generating dynamic pressure may be formed on a bearing surface of the bearing. The grooves may be formed, for example, in a sizing process in which the bearing hole is finished to the designed size. In this production method, the bearing surface is not easily broken and the powders consisting thereof are not easily loosened therefrom since the pores are filled with the resin. As a result, the grooves are easily worked, and shape and size of the grooves are precisely obtained.

The spindle motor of the invention comprises the above-described bearing unit of the invention and a rotating shaft supported by the bearing unit. In the spindle motor, the advantages provided by the bearing unit of the invention are exhibited and superior performances are demonstrated.

DESCRIPTION OF THE PREFERRED EMBODIMENTS

Embodiments in which the invention is applied to HDD motors will be explained with reference to the drawings hereinafter.

Figure 1:
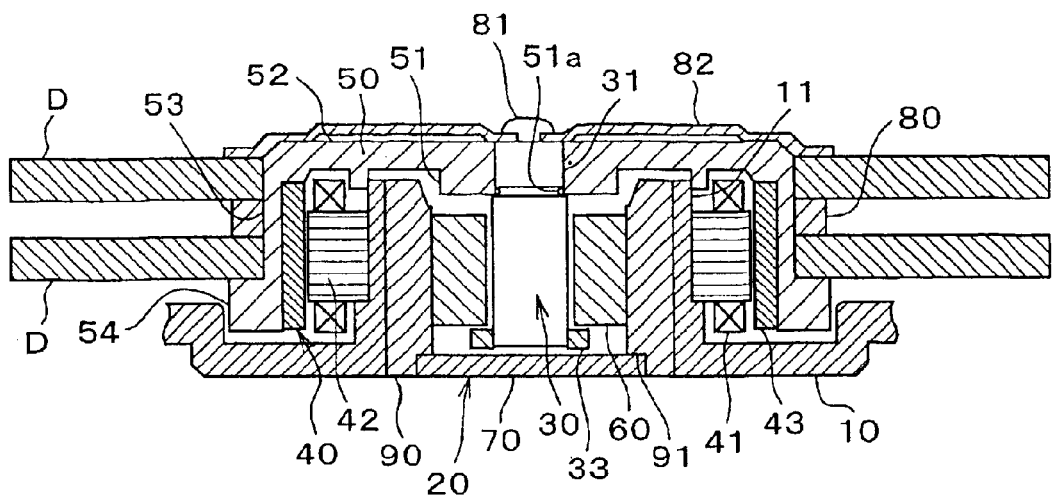
FIG. 1 is a vertical cross-sectional view of an HDD spindle motor in accordance with an embodiment of the present invention.

FIG. 1 shows a cross section of a spindle motor. The spindle motor is adapted to rotate two magnetic disks D, and comprises a case 10, a bearing unit 20, a rotating shaft 30 rotatably supported by the bearing unit 20, a motor 40, and a hub 50 which supports the magnetic disk D and is rotated by the action of the motor.

Figure 2:
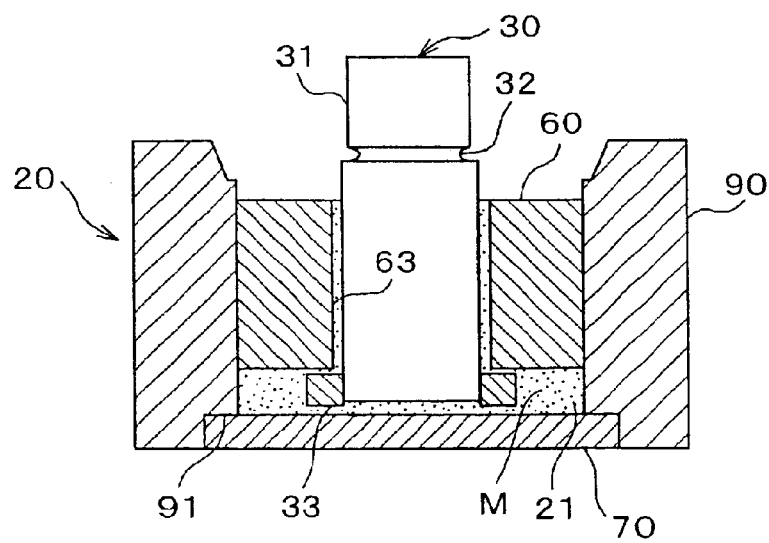
FIG. 2 is a vertical cross-sectional view of the bearing unit in accordance with the embodiment.

A cylindrical holder 11 protruding upwardly in FIG. 1 is formed at the center of the case 10, and the bearing unit 20 is accommodated therein. As shown in FIG. 2, the bearing unit 20 consists of a cylindrical housing 90, a disk-shaped thrust plate 70 which closes the lower aperture of the housing 90, and a cylindrical bearing 60 accommodated in the housing 90. The thrust plate 70 is fitted into a peripheral recess 91 formed at the inner edge of the lower side of the housing 90, and is secured thereto by means such as caulking, welding, adhering, or the like. The bearing unit 20 is secured in the holder 11 of the case 10 by press fitting, or is fitted into the holder 11 and secured by means of welding, or the like.

As shown in FIG. 1, the rotating shaft 30 upwardly projects from the bearing 60, and the projected end thereof is formed with a hub fastener 31 to which a hub 50 is secured. The hub 50 has an approximately hat-shaped cross section, and consists of a disk portion 52 formed with a boss 51 projecting inwardly at its center, a cylinder 53 extending downwardly from the circumference of the disk portion 52, and a flange 54 projecting outwardly from the circumference of the cylinder 53. The hub fastener 31 of the rotating shaft 30 is inserted and fitted into the hollow portion of the boss 51. An annular protrusion 51a is formed on the inner surface of the lower end of the boss 51. The protrusion 51a is fitted into a groove 32 formed on the outer surface of the rotating shaft 30 (see FIG. 2), whereby the hub 50 is secured to the rotating shaft 30. It should be noted that the protrusion 51a may be fitted into the groove 32 by press fitting the rotating shaft 30 into the hollow portion of the hub 50. The hub 50 may be made from an elastic synthetic resin such as a plastic, and it is elastically deformed outwardly by the rotating shaft 30 in the press fitting. With this mode of fastening, the inner peripheral surface of the cylinder 53 of the hub 50 and the outer peripheral surface of the holder 11 of the case 10 oppose each other. A motor stator 42 wound with a coil 41 is secured to one of the opposing surfaces at the casing 10 side, and a motor magnet 43 is secured to the other surface at the hub 50 side. The motor stator 42 and motor magnet 43 form the motor 40.

A pair of magnetic disks D holds ring-shaped spacer 80 therebetween, and magnetic disks D are fitted to the outer surface of the cylinder 53 of the hub 50. These disks D are held between a damper 82 which is mounted to the upper end surface of the rotating shaft 30 by a screw 81 and the flange 54 and are supported by the hub 50.

The above is the overall construction of the spindle motor in the first embodiment. In this motor, when a specified electric current is supplied to the coil 41 and an electromagnetic field is generated from the motor stator 42, the hub 50 rotates around the rotating shaft 30 due to the electromagnetic interaction generated between the electromagnetic field and the motor magnet 43, and thus, the hub 50 causes magnetic disks D to rotate.

The rotating shaft 30 is rotatably supported by the bearing unit 20 More specifically, the rotating shaft 30 is inserted into the bearing 60, and the lower end surface 36 thereof is supported by the thrust plate 70. In this condition, the radial load and the thrust load of the rotating shaft 30 are respectively supported by the bearing 60 and the thrust plate 70.

The construction of the bearing unit 20 and the rotating shaft 30 will be described in detail hereinafter.

The bearing 60 is made from a porous sintered alloy in which a magnetized magnetic powder is dispersed in a matrix, and the bearing 60 is magnetized by the magnetic powder. Alnico powder may be used for the magnetic powder and bronze-type alloys may preferably be used for the remainder of the basic alloy powder. The proportion of the Alnico powder is preferably 30 to 70 weight %. The bearing 60 is produced by compacting the mixed powder of the magnetic powder and the base alloy powder, sintering the resulting mixture, and then magnetizing.

The entire inner surface of the bearing 60 is employed as a bearing surface 63 which receives a radial load of the rotating shaft 30. At least pores existing on the bearing surface 63 are impregnated with a resin such as acrylic resin so as to be sealed. The sealing by the resin may be performed at only the bearing surface, or may be performed to overall pores in the bearing 60.

Various suitable materials may be used for the bearing unit 20 (housing 90, bearing 60, and thrust plate 70) and the rotating shaft 30, for example, various stainless steels and various copper alloys (such as bronze or brass), and porous sintered alloys may be used for bearing unit 20. When the bearing 60 and the thrust plate 70 are made of copper alloy, the above described herringbone grooves 65 and spiral grooves 72 can be formed by chemical etching, electrolytic etching, or by coining. In the case of sintered alloy, the grooves 65 and 72 can be formed by press forming a green compact or sizing a sintered compact.

Figure 3:
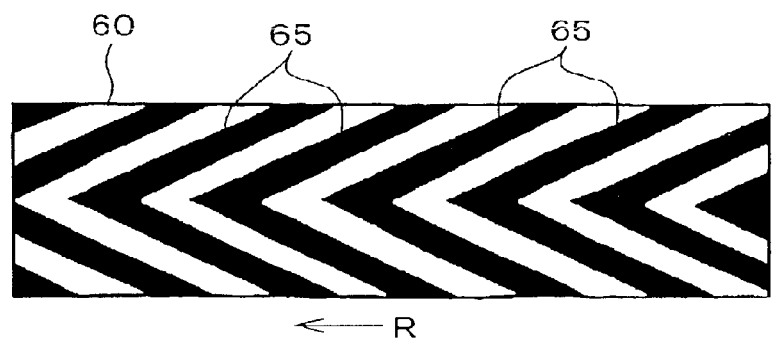
FIG. 3 is an expanded view of the inner peripheral surface of the bearing formed with dynamic pressure generating grooves.

As shown in FIG. 3, herringbone grooves 65 comprised of multiple V-shaped grooves for generating radial dynamic pressure is formed in the bearing surface 63. The herringbone grooves 65 are formed parallel to each other at equal intervals and the intersecting portions thereof converge toward the rotational direction R of the rotating shaft 30.

The housing 90 is formed in a cylindrical shape from non-magnetic materials such an austenite stainless steel. The bearing 60 is secured in the housing 90 by means of press fitting, welding, or the like.

The rotating shaft 30 is rotatably supported by the bearing 60 and the radial load of the rotating shaft 30 is supported by the bearing 60. As shown in FIG. 2, a thrust ring 33 is peripherally secured to the lower end of the rotating shaft 30. The lower end surface of the thrust ring 33 is slightly lower than the end surface of the rotating shaft 30, and is supported by the thrust plate 70. Therefore, the thrust load of the rotating shaft 30 is supported by the thrust plate 70 via the thrust ring 33. The thrust ring 33 also restrains upward displacement of the rotating shaft 30 by engaging with the lower end surface of the bearing 60. Herringbone grooves as shown in FIG. 3 are formed on the both end surfaces of the thrust ring 33. The thrust ring 33 is secured to the rotating shaft 30 by means of press fitting, welding, or the like.

A production method for the bearing unit 20 will be explained hereinafter.

In the production of the bearing 60, a raw metallic powder mixed with a magnetic powder is compacted into a green compact, the green compact is subjected to a sintering process, and a sintered compact is produced, according to a typical powdered metal technique. Then, the sintered compact is dipped in a resin solvent charged in a container, and the interior of the container is decompressed so as to impregnate the resin solvent into all the pores in the sintered compact. In such a method, the resin is quickly and reliably impregnated into the pores of the sintered compact. When the impregnation with the resin is completed, the sintered compact is dried. Then, the bearing 60 is press fitted into the housing 90, or is fitted and welded to the housing 90. Subsequently, the bearing 60 is subjected to sizing such as a method in which a core rod is inserted into the bearing hole of the bearing 60, and the bearing 60 is compressed in the axial direction so as to complete the bearing hole in a designed size and to form herringbone grooves 65. Finally, the bearing 60 together with the housing 90 are placed in a magnetic field so as to magnetize the bearing 60. The housing is not magnetized since it is made of a non-magnetic material. Thus, the bearing unit 20 consisting of the non-magnetic housing 90 and the bearing 60 assembled in the housing 90 is produced. The bearing 60 includes the magnetic powder dispersed in its matrix, the resin impregnated into the pores, and the herringbone grooves formed on the bearing surface 63.

The order of the steps for accommodating and securing the bearing 60 in the housing 90 can be changed in the above method. That is, first, the sintered compact is accommodated and secured in the housing 90, and the sintered compact is then dipped into the resin solvent together with the housing 90. Then, the sintered compact is subjected to the decompressing process, thereby impregnating the resin into the pores in the sintered compact, and the bearing 60 is thus produced. Subsequently, the bearing 60 is magnetized.

It should be noted that only pores existing in the bearing surface side may be sealed by impregnation with a resin. This structure may be obtained such that a resin having a small viscosity is coated on only the bearing surface 63 to impregnate the resin in pores, and the bearing 60 may be heated to cure the resin in the pores.

After assembling the bearing 60 into the housing 90, the rotating shaft 30 secured with the thrust ring 33 is inserted into the bearing 60, and then the thrust plate 70 is fitted and secured in the recess 91 of the housing 90, and the rotating shaft 30 is thus set in the bearing unit 20.

In this assembled mode, a small gap to which a magnetic fluid M is supplied is formed between the bearing surface 63 of the bearing 60 and the outer surface of the rotating shaft 30. A gap for oil reservoir 21 is formed between the bearing 60 and the thrust plate 70. The thrust ring 33 secured to the rotating shaft 30 is positioned in the oil reservoir 21. The thickness of the thrust ring 33 is set such that a small gap is formed between the thrust ring 33, bearing 60, and the thrust plate 70. The bearing unit 20 is secured in the holder 11 of the case 10 by press fitting the housing 90 into the holder 11 of the case 10, or fitting and securing the housing 90 in the holder 11 by welding, adhering, or the like, as mentioned above.

The interactions of the bearing unit 20 and the rotating shaft 30 supported thereby will be explained hereinafter. When the rotating shaft 30 rotates by the action of the motor 40, magnetic fluid M from the oil reservoir 21 enters into the gap between the thrust plate 70 and the lower end surfaces of the rotating shaft 30 and the thrust ring 33, between the thrust ring 33 and the bearing 60, and between the bearing surface 63 of the bearing 60 and the outer surface of the rotating shaft 30, and forms an oil film. Thus, high precision rotation and quietness can be obtained since the rotating shaft 30 is supported by the bearing unit 20 in a non-contact.

Furthermore, the rotating shaft 30 is supported with high radial rigidity since dynamic pressure is generated by the magnetic fluid M supplied to the herringbone grooves 65 between the bearing surface 63 of the bearing 60 and the outer surface of the rotating shaft 30.

Dynamic pressure is generated by the magnetic fluid M supplied to the herringbone grooves formed on the lower surface of the thrust ring 33 between the thrust ring 33 and the thrust plate 70 and the rotating shaft 30 float from the thrust plate 70. However, dynamic pressure is also generated by the magnetic fluid M supplied to the herringbone grooves formed on the upper surface of the thrust ring 33 between the upper surface of the thrust ring 33 and the bearing 60, and the rotating shaft 30 is biased downwardly (toward the thrust plate 70), whereby the axial position of the rotating shaft 30 is stable and high impact resistance is ensured.

According to the bearing unit 20 of the embodiment, the bearing 60 is magnetized since a magnetic powder is dispersed therein, and the magnetic force usually holds the magnetic fluid within the lubricating pathway, that is, between the rotating shaft 30, bearing 60 and the thrust plate 70. Therefore, lubrication is effectively performed and leakage of the magnetic fluid is restrained. Furthermore, magnets are not required since the bearing 60 functions as a magnet for holding the magnetic powder, and the structure thereof can therefore be simple without any additional parts, and the thickness of the structure can be reduced.

The bearing surface 63 of the bearing 60 on which pores are sealed by a resin is lubricated by the resin, and the fitting performance between the bearing 60 and the rotating shaft 30 is therefore improved in spite of dispersion of the magnetic powder. In addition, the resin adheres the powders consisting of the bearing to the bearing surface and restrain loose of the powders. As a result, wear due to the powders existing between the bearing surface 63 and the rotating shaft 30 is restrained, and vibration performance is therefore stable, and high precise rotation is obtained. Moreover, the dynamic pressure generated by the magnetic fluid in the grooves does not leak since the pores on the bearing surface 63 are sealed, and high rigidity of the bearing is maintained. Furthermore, the bearing surface 63 is not easily broken and the powders consisting thereof are not easily loosened therefrom when the herringbone grooves 65 are formed on the bearing surface 63 since the pores are filled with the resin. As a result, the grooves are easily worked and shapes and sizes of the grooves are precisely obtained.

Figure 4:
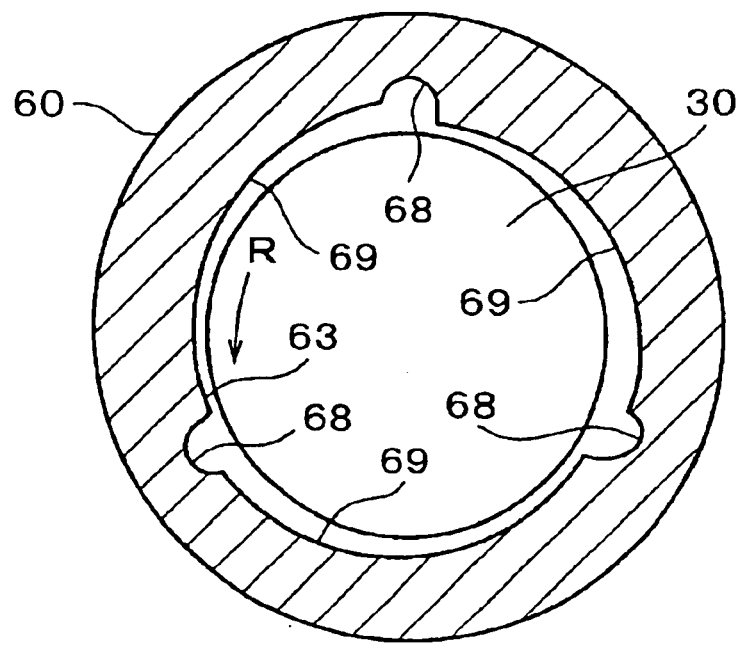
FIG. 4 is a horizontal cross-sectional view of the inner peripheral surface of the bearing formed with dynamic pressure generating grooves.

Although the grooves for generating dynamic pressure are herringbone grooves in the embodiment, the design shown in FIG. 4 may be employed as the dynamic pressure generating grooves. In FIG. 4, oil reserving grooves 68 are formed at equal peripheral intervals extending in the axial direction on the bearing surface 63. Wedge-shaped grooves 69 are formed between the oil reserving grooves 68 with smaller clearance in the rotational direction R of the rotating shaft 30.

Figure 5:
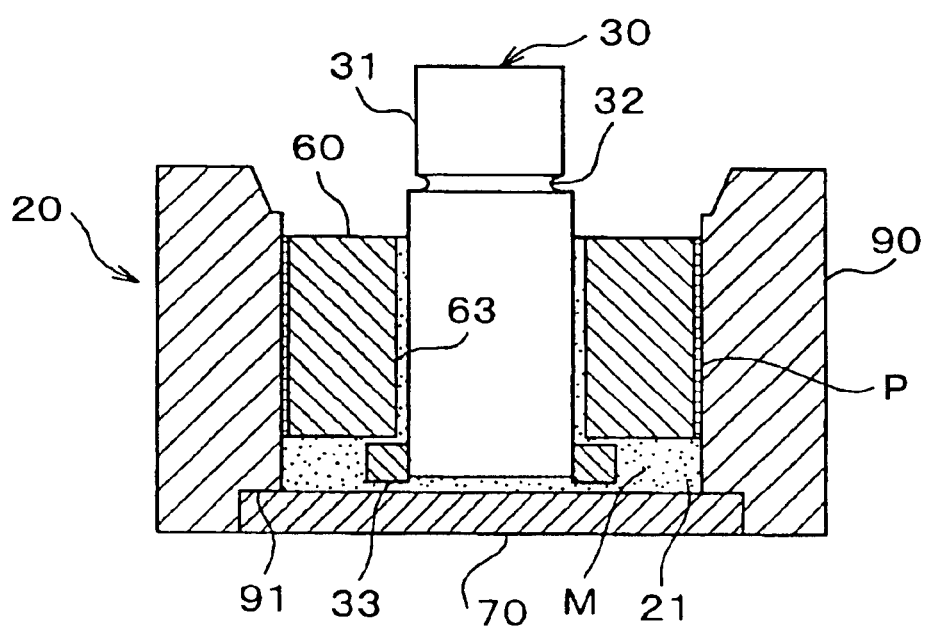
FIG. 5 is a vertical cross-sectional view of the bearing unit in accordance with a modification of the embodiment.

The bearing 60 may be secured in the housing 90 by an adhesive in addition to press fitting and welding. In this securing mode, the bearing 60 has a clearance of approximately a few μm to 10 μm with respect to the inner surface of the housing 90, and an adhesive P is charged into the clearance, as shown in FIG. 5. The clearance may normalize the amount of the adhesive P, and sufficient securing strength between the bearing 60 and the housing 90.

What is claimed is:

1. A bearing unit comprising:
    a bearing formed of a sintered metal in which a magnetized magnetic powder is dispersed in its matrix and at least pores exposed on a bearing surface thereof are sealed by impregnation with a resin;
    a non-magnetic housing accommodating the bearing; and
    a lubricating fluid made of a magnetic fluid.

2. The bearing unit according to claim 1, wherein only pores existing in the bearing surface side are sealed by impregnation with a resin.

3. The bearing unit according to claim 1, wherein the bearing surface of the bearing has grooves for generating dynamic pressure.

4. A spindle motor comprising:
    a bearing unit recited in claim 1; and
    a rotating shaft supported by the bearing unit.

5. A production method for a bearing unit, the method comprising:
    compacting a metallic raw material powder mixed with a magnetic powder into a bearing green compact;
    sintering the green compact into a sintered compact; then
    impregnating a resin into poles in the sintered compact to yield a bearing;
    accommodating and securing the bearing in a housing; and then
    magnetizing the bearing.

6. The production method for a bearing unit according to claim 5, wherein, the bearing has a clearance with respect to the housing, and an adhesive is applied to the clearance.

7. The production method for a bearing unit according to claim 5, wherein the sintered compact is dipped into a resin solution in a container, and the interior of the container is then decompressed.

8. The production method for a bearing unit according to claim 5, wherein grooves for generating dynamic pressure are formed on a bearing surface of the bearing.

9. A production method for a bearing unit, the method comprising:
    compacting a metallic raw material powder mixed with a magnetic powder into a bearing green compact;
    sintering the green compact into a sintered compact;
    accommodating and securing the bearing into a non-magnetic housing; then
    impregnating a resin into pores in the sintered compact to yield a bearing; and then
    magnetizing the bearing.

10. The production method for a bearing unit according to claim 9, wherein, the bearing has a clearance with respect to the housing, and an adhesive is applied to the clearance.

11. The production method for a bearing unit according to claim 9, wherein the sintered compact is dipped into a resin solution in a container, and the interior of the container is then decompressed.

12. The production method for a bearing unit according to claim 9, wherein grooves for generating dynamic pressure are formed on a bearing surface of the bearing.

* * * * *

UNITED STATES PATENT AND TRADEMARK OFFICE
CERTIFICATE OF CORRECTION

| | |
|---|---|
| PATENT NO. | : 6,851,859 B2 |
| APPLICATION NO. | : 10/360408 |
| DATED | : February 8, 2005 |
| INVENTOR(S) | : Toshikazu Takehana et al. |

Page 1 of 1

It is certified that error appears in the above-identified patent and that said Letters Patent is hereby corrected as shown below:

<u>In the Claims</u>

Column 8, in claim 5, line 6, after "a resin into" delete "poles" and substitute --pores-- in its place.

Signed and Sealed this

Twentieth Day of November, 2007

JON W. DUDAS
*Director of the United States Patent and Trademark Office*